(12) United States Patent
Rao et al.

(10) Patent No.: US 9,258,460 B2
(45) Date of Patent: Feb. 9, 2016

(54) IMAGE PROCESSING METHOD AND APPARATUS FOR CORRECTING AN IMAGE

(71) Applicant: Forus Health Pvt. Ltd., Bangalore, Karnataka (IN)

(72) Inventors: Shyam Vasudeva Rao, Karnataka (IN); Mahabaleswara Ram Bhatt, Karnataka (IN); Sriram Padmanavhan, Karnataka (IN)

(73) Assignee: FORUS HEALTH PVT. LTD., Bangalore, Karnataka (IN)

( * ) Notice: Subject to any disclaimer, the term of this patent is extended or adjusted under 35 U.S.C. 154(b) by 159 days.

(21) Appl. No.: 14/103,957

(22) Filed: Dec. 12, 2013

(65) Prior Publication Data

US 2014/0160323 A1    Jun. 12, 2014

(30) Foreign Application Priority Data

Dec. 12, 2012    (IN) ............................. 5167/CHE/2012

(51) Int. Cl.
| | | |
|---|---|---|
| G06K 9/42 | (2006.01) | |
| H04N 5/217 | (2011.01) | |
| H04N 9/04 | (2006.01) | |
| G06K 9/00 | (2006.01) | |
| G06T 5/00 | (2006.01) | |
| G06T 5/30 | (2006.01) | |

(52) U.S. Cl.
CPC ............ *H04N 5/2171* (2013.01); *G06K 9/0061* (2013.01); *G06T 5/002* (2013.01); *G06T 5/30* (2013.01); *H04N 9/045* (2013.01); *G06T 2207/10024* (2013.01); *G06T 2207/20032* (2013.01)

(58) Field of Classification Search
USPC .......................................... 382/257; 348/242
See application file for complete search history.

(56) References Cited

PUBLICATIONS

Mudit Agrawal and David Doermann, "Clutter noise removal in binary document images", Apr. 30, 2011, Retrieved on Jul. 14, 2015 from Internet:<URL:http://lampsrv02.umiacs.umd.edu/pubs/Papers/muditagrawal-13/muditagrawal-13.pdf>.*
Scholfield et al., "Fast Retinal Vessel Detection and Measurement Using Wavelets and Edge Location Refinement", 2012, Queen's University Belfast—Research Portal, Retrieved from Internet on Jul. 14, 2015 from:<URL:http://pure.qub.ac.uk/portal/files/2489299/Fast_Retinal_Vessel_Detection_and_Measurement_Using_Wavelets_and_Edge_Location_Refinement.pdf>.*

* cited by examiner

*Primary Examiner* — Gregory F Cunningham
(74) *Attorney, Agent, or Firm* — Harness, Dickey & Pierce, PLC (57) ABSTRACT

The present disclosure relates to method and apparatus for image recovery and image correction. In an embodiment, the present disclosure relates to recovering images that are occluded due to some material in the optical path while capturing the images. The detection of noisy region is performed by taking the residual image between the images yielded by large sized and small sized Gaussian window smoothening filters on red, green and blue channels. The recovery of the image that alleviates the noise is obtained by point-wise multiplication of the above said residue image with a suitably synthesized Gaussian distributed co-efficient of same size.

8 Claims, 9 Drawing Sheets
(4 of 9 Drawing Sheet(s) Filed in Color)

IMAGE PROCESSING METHOD AND APPARATUS FOR CORRECTING AN IMAGE

TECHNICAL FIELD

The present disclosure relates to image processing. In particular, the present disclosure relates to a method and an apparatus for alleviating image artifacts caused by dirty camera lenses.

BACKGROUND

In photography or image acquisition and/or processing techniques, impurities can cause imperfections in any images produced. The impurities can include dust, dirt or any type of thin occlude material which attenuates the incoming light and scatters the portion of light towards the camera capturing the image. For example, if dust is introduced into a camera or image processing system, such dust can cause obstructions, shadows or other extraneous or undesired artifacts in any images that are ultimately produced.

Conventionally, when a foreign substance such as dust sticks to the image capturing optical system, the captured images from the system may contain a foreign substance. Hence, the quality of the image degrades. This type of image degradation not only amounts to annoying effect but also hinders the analysis that are aimed to either some pathological defects detection in medical image based expert system or any other image based image systems.

Dust or other impurities or the effects caused by the presence of such impurities may be decreased or removed from an image processing method. However, the conventional dust correction may degrade the image quality depending on the object state around the dust. In some cases, smearing may occur in the object upon dust correction, and a sense of incongruity may be generated between the dust region and its periphery.

The present disclosure has been made in consideration of the above-described problems, and relates to a method and an apparatus for correcting an image.

SUMMARY OF THE DISCLOSURE

The shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

The present disclosure relates to removal of effects of impurities, such as dust particles, from an image.

In an embodiment, the present disclosure optimizes a dust correction condition and increases the quality of an image to be output.

In an embodiment, the image processing of the present disclosure aims in recovering the images that are occlude or corrupted due to some material in the optical path while capturing the images.

In one embodiment, the present disclosure relates to an image processing method for correcting an image. The method comprises obtaining a high smoothened image $I_H$ and a low smoothened image $I_L$ by applying large size and small size median window filter on the image $I_C$. Further, a noise alleviated image using images obtained using the above step. An intermediate image is generated by performing point wise multiplication between corresponding pixels of the image $I_C$ and the low smoothened image $I_L$. Further, the method comprises obtaining a residual image by subtracting each pixel of high smoothened image $I_H$ from corresponding pixels of the intermediate image and generating a binary image from the residual image. Then, morphological erosion is applied on the binary image for a predetermined number of times and a rim portion of the received image is obtained by performing pixel wise subtraction between the generated binary image and the image obtained after morphological erosion. Further, the method comprises obtaining portions of the image $I_C$ to be blurred by placing rim portion of the image as mask over the noise alleviated image and performing blurring on the portions of the image $I_C$ by using window of a predetermined size for a predetermined color model and obtaining a corrected image.

In one embodiment, the present disclosure relates to an image processing apparatus for correcting an image. The apparatus comprises an image receiving unit configured to receive the image to be corrected from an image capturing unit and a processor coupled to the image receiving unit. The processor is configured to obtain a high smoothened image $I_H$ and a low smoothened image $I_L$ by applying large size and small size median window filter on the image $I_C$ and obtain a noise alleviated image from above step. Then the processor generates an intermediate image by performing point wise multiplication between corresponding pixels of the image $I_C$ and the low smoothened image $I_L$. Further the processor generate a binary image from a residual image, said residual image is obtained by subtracting each pixel of highly smoothened image $I_H$ from corresponding pixels of the intermediate image. The processor is also configured to apply morphological erosion on the binary image for a predetermined number of times and obtain rim portion of the received image by performing pixel wise subtraction between the generated binary image and the image obtained after morphological erosion. Further, the processor obtains portions of the image $I_C$ to be blurred by placing rim portion of the image as mask over the noise alleviated image and performs blurring on the portions of the image $I_C$ by using window of a predetermined size for a predetermined color model and obtaining a corrected image. The apparatus further comprises a memory unit coupled with the processor.

The aforementioned and other features and advantages of the disclosure will become further apparent from the following detailed description of the presently preferred embodiments, read in conjunction with the accompanying drawings. The detailed description and drawings are merely illustrative of the disclosure rather than limiting, the scope of the disclosure being defined by the appended claims and equivalents thereof.

BRIEF DESCRIPTION OF THE DRAWINGS

The patent or application file contains at least one drawing executed in color. Copies of this patent with color drawings will be provided by the Patent and Trademark Office upon request and payment of necessary fee.

The features of the present disclosure are set forth with particularity in the appended claims. The embodiments of the disclosure itself, together with further features and attended advantages, will become apparent from consideration of the following detailed description, taken in conjunction with the accompanying drawings. One or more embodiments of the present disclosure are now described, by way of example only, with reference to the accompanied drawings wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1:
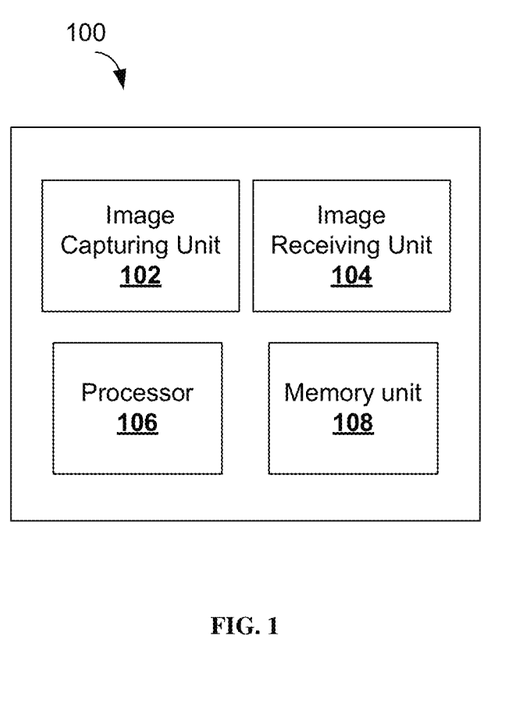
FIG. 1 illustrates an image processing apparatus for correcting an image in accordance with an embodiment of the present disclosure.

FIG. 1 illustrates an image processing apparatus for correcting an image in accordance with an embodiment of the present disclosure. The image processing apparatus 100 comprises an image capturing unit 102, image receiving unit 104, a processor 106 and a memory unit 108. The image receiving unit 104 is configured to receive an image to be corrected $I_C$ from the image capturing unit 102. The image receiving unit 104 is communicatively connected to the processor 106. The memory unit 108 is connected to the processor 106 to store images.

Figure 2:
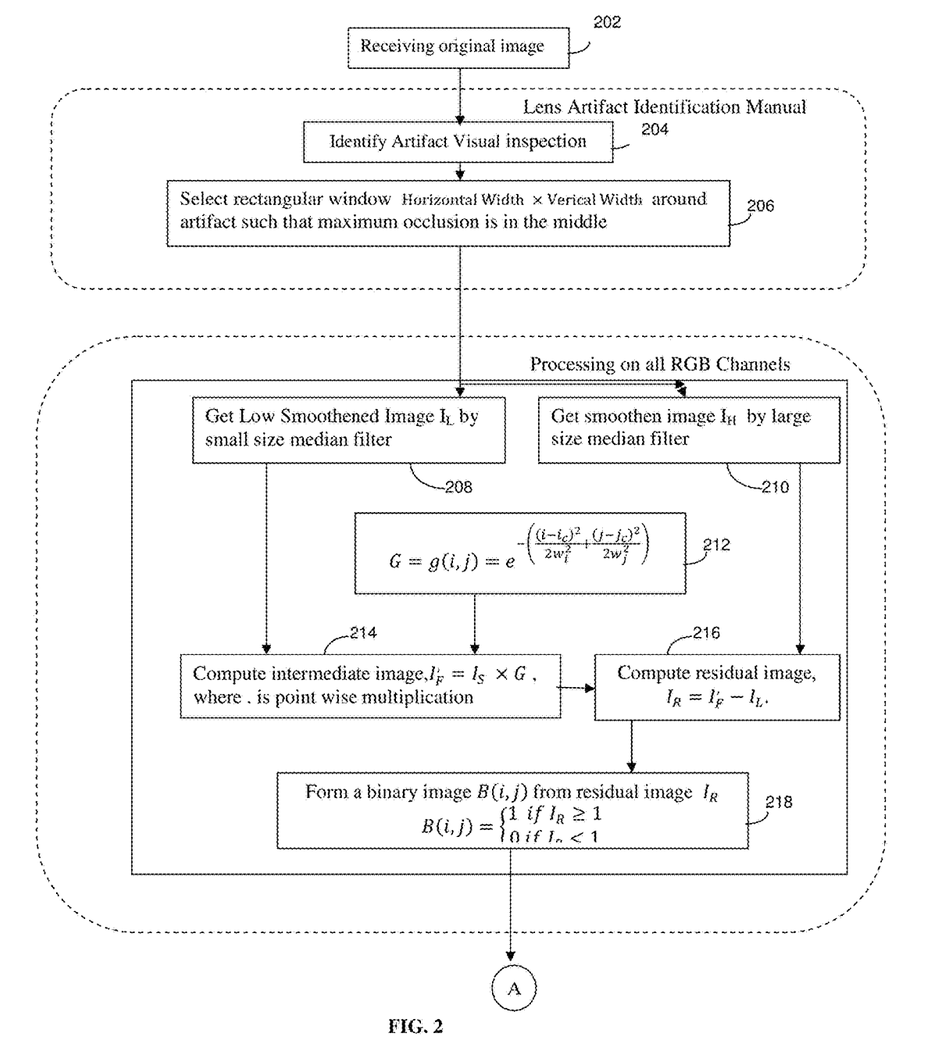
FIG. 2 illustrates a flowchart explaining an image processing method in accordance with an embodiment of the present disclosure.

FIG. 2 illustrates a flowchart explaining an image processing method in accordance with an embodiment of the present disclosure.

Figure 3:
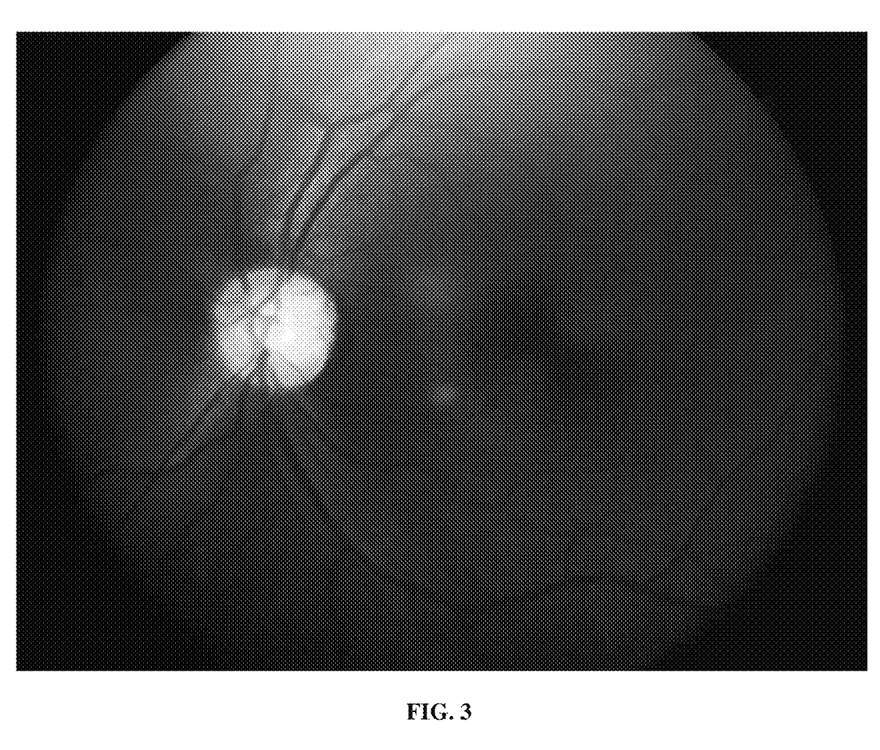
FIG. 3 illustrates an original image to be corrected in accordance with an embodiment of the present disclosure.

FIG. 3 illustrates an original image to be corrected in accordance with an embodiment of the present disclosure. The image in the illustrated figure is a retinal image. However, any image that is occluded or corrupted due to some material in the optical path while capturing the image can be taken as original input image.

Referring back to FIG. 2, the model behind the formation of artefact caused due to the contaminant deposition on the path of light while capturing an image is described below. The contaminant deposition can be due to materials including but not limited to oil or dust or any other semi-transparent occluding material. The model sets a foundation for a methodology to identify and alleviate this kind of artefacts caused in the image. In an exemplary embodiment, it is assumed that above said semi-transparent contaminant particles are causing light attenuators that ultimately alter the image according to the below form $$I(i,j) = \alpha(i,j) \times J(i,j) \quad (1)$$

Where $I(i,j)$ is a pixel of an image with lens artefact caused due to light attenuator, $\alpha(i,j)$ on pixel of a lens artefact-free image $(i,j)$. In this embodiment, it is assumed that the causing of these artefacts diffraction of light is negligible, since regions of these semi-transparent occlude do not exhibit interference effects associated with diffraction around the edges of a barrier. In the above model, considered scattering effect due to occluding object is not considered since it is negligibly small.

First, an image to be corrected $I_C$ is received from the image receiving unit 102 at step 202. Then, the corrupted region in the image containing the image artifact is identified. The corrupted region identification process can be done manually or automatically.

Figure 5:
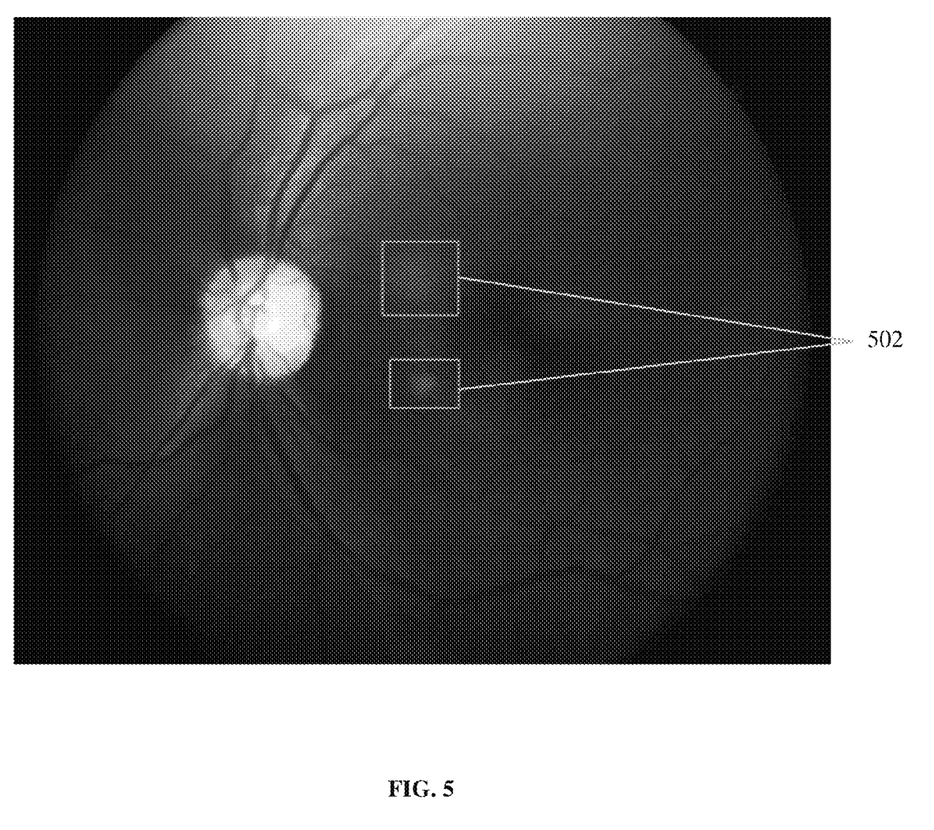
FIG. 5 illustrates a selected lens artifact region from the original image in accordance with an embodiment of the present disclosure.

The manual selection procedure for identifying corrupted region in the image comprises:
i) Identifying the region that is corrupted due to semi-transparent occluding object by visual inspection in the image at step 204.
ii) Selecting a rectangular block image with horizontal width and vertical width as 'Horizontal Width' and 'Vertical Width' respectively at step 206. The rectangular block image is selected such that lens artifact with maximum occlusion is approximately located in the mid portion and rest of the occluded image is also covered as illustrated in FIG. 5. The rectangular block comprising selected image artifact is marked as 502.

The automatic selection procedure for identifying corrupted region in the image comprises:
i) Identifying the thin semi-transparent occluding model upon assembling of camera optical lens into an image capturing unit 102.
ii) Identifying the region that is corrupted due to semi-transparent occluding object by cross correlation method using an occluding model.

The occluding model uses the equation (1) as described above. In an embodiment of the occluding model, the image pixels is point wise multiplied by $\alpha(i,j)$. In another embodiment of the occluding model, a convolution is performed between $\alpha(i,j)$ and Image pixels. A person skilled in the art would understand that any other occluding model can be used with the present disclosure.

Figure 6:
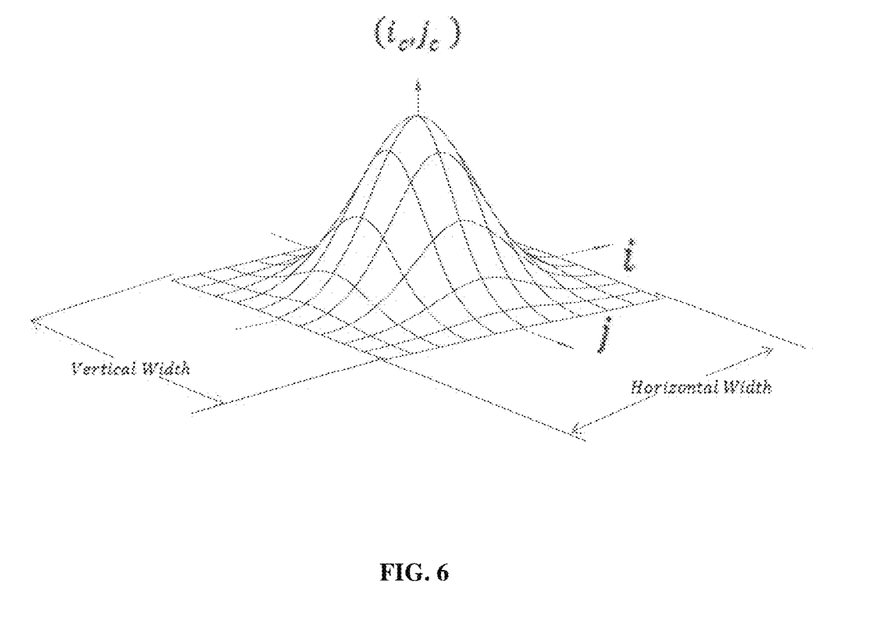
FIG. 6 illustrates thin semi-transparent model as Gaussian surface in accordance with an embodiment of the present disclosure.

In an embodiment, the term $\alpha(i,j)$ can be a single exponential function as taken in the embodiment as shown in FIG. 6. In an alternative embodiment, the term $\alpha(i,j)$ can be weighted linear combinations of the exponential functions. The number of terms in the linear combinations depends on number of layers of semi-transparent contaminant depositions and number spots contaminants with varying deposition that creates non-uniform obstructions of light rays.

iii) Selecting a rectangular block image with horizontal width and vertical width as 'Horizontal Width' and 'Vertical Width' respectively. The rectangular block image is selected such that lens artifact with maximum occlusion is approximately located in the mid portion and rest of the occluded image is also covered. In an exemplary embodiment, the 'Horizontal Width' and 'Vertical Width' of the artifact image blocks can be selected by taking respective width as 10 percent of the original image widths with highest loss due to artifact in the middle as illustrated in FIG. 5.

Following the image artifact identification, the following processing is performed for all RGB channels. At step 208, a low smoothened image $I_L$ is obtained by applying small size Gaussian kernel window median filter on the identified image artifact. In an exemplary embodiment, the window size is taken as 7×7. Further at step 210, a high smoothened image $I_H$ is obtained by applying large size median window smoothing filter on the identified image artifact. In an exemplary embodiment, the window size is taken as 105×105. Then a Gaussian image matrix G is formed by each pixel, g(i,j) using the relationship given below:

Any artifact caused due to thin semi-transparent contaminant material on the lens, which is in the path of incident or reflected light rays could be viewed as a loss in the irradiance function at each pixel location (i,j) of the captured image and same could be modelled as weighted intensity or weighted luminance function. The weighting function $\alpha(i,j)$ can be modelled as any exponentially decaying function such that maximum loss in intensity occurs at the centre $(i_c, j_c)$. One such $\alpha(i,j)$ is viewed as 2-D special weighting function (i,j), where its co-ordinate (i,j) is modelled as out of Gaussian surface on the 2D plane as defined below (as illustrated in FIG. 6):

$$g(i, j) = e^{-\left(\frac{(i-i_c)^2}{2w_i^2} + \frac{(j-j_c)^2}{2w_j^2}\right)} \quad (2)$$

Where $(i_c, j_c)$ represents center point of the image block chosen with window size (Horizontal Width×Vertical Width) that possess artifact as described earlier and parameters $w_i^2$ and $w_j^2$ are related to block size as mentioned below:

$$2w_i^2 = \text{val} \times \text{Horizontal Width} \quad (3a)$$

$$2w_j^2 = \text{val} \times \text{Vertical Width} \quad (3b)$$

Where, val is dependent on the chosen Horizontal Width and Vertical Width of image block. The parameter val helps to control the surface curvature of the chosen Gaussian surface which enables to adjust the intensity variation of the artifact on the image. g(i,j) takes maximum value, which is unity, at the center $(i_c, j_c)$ of the block of size(Horizontal Width×Vertical Width). In an exemplary embodiment, the parameter val takes value of 0.33, 0.25 respectively.

In the above model, the Gaussian weighting function g(i,j) or any generic weighting function $\alpha(i,j)$ is point operation. Hence a point wise inverse operation yields estimate of J(i,j), a lens artefact alleviated image or recovered image. FIG. 6 illustrates thin semi-transparent model as Gaussian surface.

Figure 7:
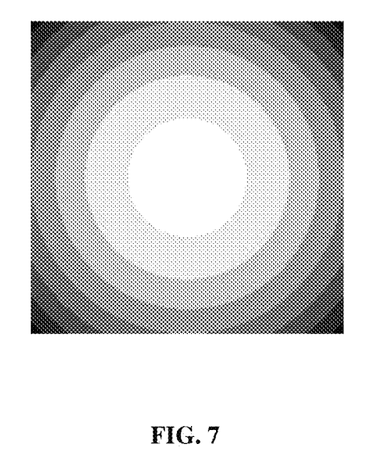
FIG. 7 illustrates a Gaussian image generated using the original image in accordance with an embodiment of the present disclosure.
Figure 8A:
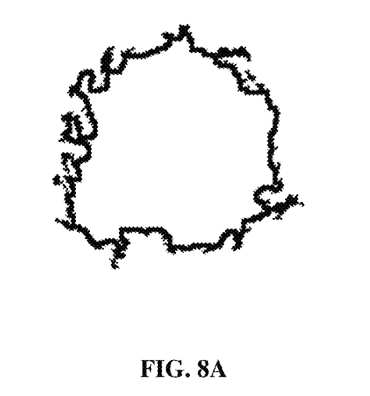
FIGS. 8a, 8b, and 8c illustrates rim of the top artifact for blue, green and red channel respectively in accordance with an embodiment of the present disclosure.
Figure 8B:
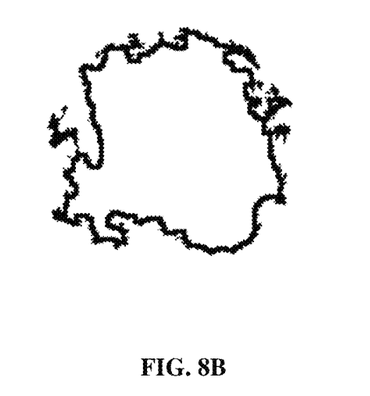
Figure 8C:
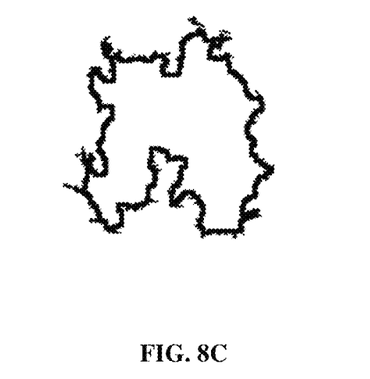
Figure 9A:
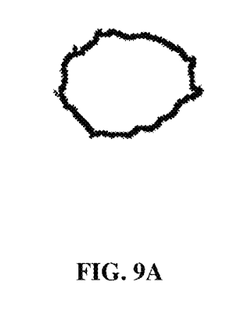
FIGS. 9a, 9b, and 9c illustrates rim of the bottom artifact for blue, green and red channel respectively in accordance with an embodiment of the present disclosure.
Figure 9B:
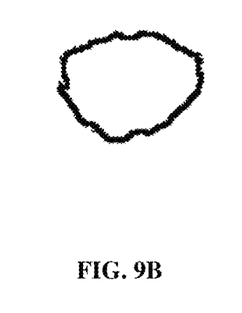
Figure 9C:
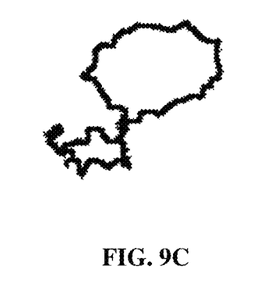

FIG. 7 illustrates generated Gaussian image as per the manual and automatic selection procedure for identifying corrupted region in the image.

Further, at step 214, an intermediate image $I_F'$ is obtained by performing point wise multiplication between low smoothened image $I_L$ and Gaussian image G, such that intermediate image $$I_F' = I_L \cdot G,$$

where · is point wise multiplication between corresponding pixels of $I_L$ and G.

At step 216, a residual image $I_R$ is calculated by subtracting each pixels of high smoothened image $I_H$ from corresponding pixels of the intermediate image $I_F'$, such that $$I_R = I_F' - I_H$$

Then, a binary image is formed from the residual image at step 218 by performing the binarization process as below:

$$B(i, j) = \begin{cases} 1 & \text{if } I_R \geq 1 \\ 0 & \text{if } I_R < 1 \end{cases}$$

In binarization process, a gray scale image is converted into a binary image. The binary images are formed by using threshold. If pixel value is greater than threshold then binary pixel value is selected as 1, otherwise the binary pixel value is selected as 0. If the image corresponding to intended object takes 0, then background would will be 1 or vice versa.

At step 220, morphological erosion is applied for plurality of iterations, for example 3 iterations on the binary image and a lens artifact corrupt region as biggest white patch is identified in the above obtained binary image B(i,j). The erosion is a morphological process in which one or more pixels that is touching one or more background pixels is changed into the one or more background pixels. Any morphological operation refers to certain operation like erosion, where an object is hit by a structuring element. Erosion is a shrinking operation and is dependent on structuring element. Additionally, erosion operation is accompanied by enlargement of background.

In binary morphology, an image is viewed as a subset of a Euclidean space $R^d$ or the integer grid $Z^d$, for some dimension d. The basic idea in binary morphology is to probe an image with a simple, pre-defined shape, drawing conclusions on how this shape fits or misses the shapes in the image.

Further, an image recovery procedure or lens artifact removal procedure is as described below:

First, a region of rim is obtained at step 220 by performing pixel wise subtraction between B(i,j) before and after erosion process. Then, the lens artifact alleviated image J(i,j) is obtained at step 222 by computing:

$$J(i,j) = (I_F - I_L) \times G \times (\text{reduction\_value}),$$

where reduction_value for red, green and blue channel is chosen as 0.7, 0.7 and 0.5, respectively.

Further, the rim portion of the image is used as mask in the lens artifact image computed above and the following processing is performed as illustrated in FIGS. 8a, 8b, 8c, 9a, 9b and 9c.

i) Performing blurring operation on the portion of the image pixels mentioned in the above step using windows as 51×51, 51×51 and 9×9 for green, blue and red channel, respectively.

ii) Obtain a refined lens artifact alleviated output image J(i,j) by replacing pixels lens artifact alleviated image J(i,j) in rim portion with pixel obtained by blurring operation and retaining remaining pixels as it is.

Figure 4:
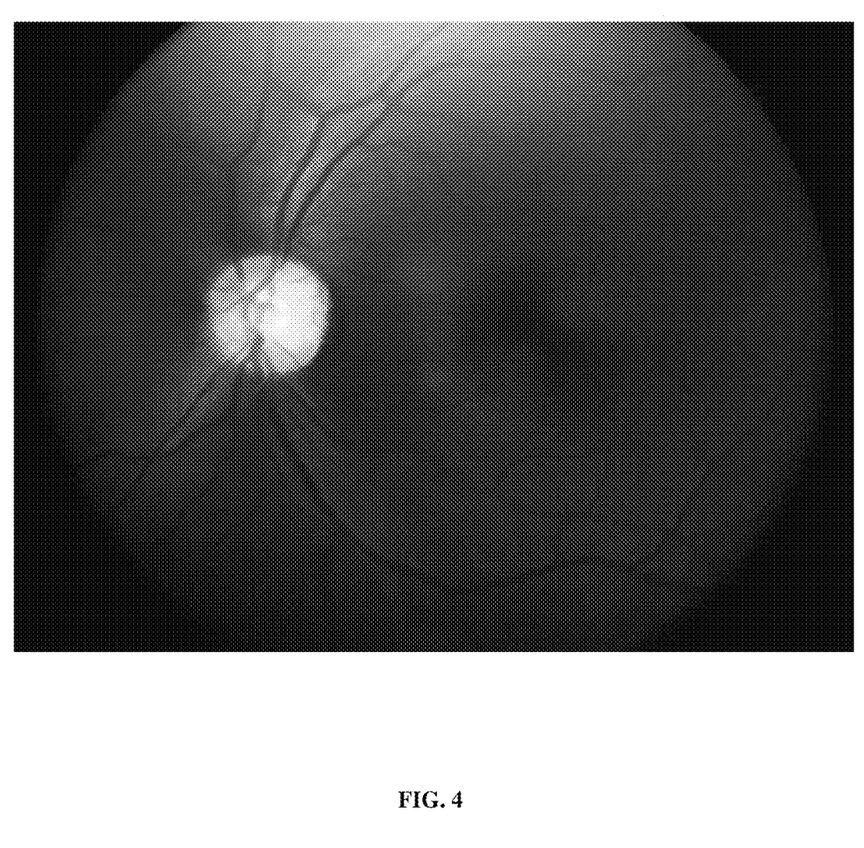
FIG. 4 illustrates the corrected original image by image processing method of the present disclosure.

FIG. 4 illustrates the corrected original image by image processing method of the present disclosure. Once the original image is treated with image processing method of the present disclosure, the final image obtained is illustrated in FIG. 4.

In an embodiment, the present disclosure alleviated the effect of artifact noise in images. The method of the present disclosure does not restrict to the relationship mentioned with exponentials. The method can be generalized with one or more linear or non-linear combination of exponentials.

The method of identification and recovery of image artifact noise is not only limited to image artifact caused by a single occluding semi transparent material. An image with any number of such artifacts can be used as input image for the method of the present disclosure. This written description uses examples to disclose embodiments of the present disclosure, including the best mode, and also to enable any person skilled in the art to practice the technology disclosed in the present disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An image processing method for correcting an image $I_C$, said method comprising steps of:
   a. obtaining a high smoothened image $I_H$ and a low smoothened image $I_L$ by applying large size and small size median window filter on the image $I_C$;
   b. obtaining a noise alleviated image from $I_H$ and $I_L$, by performing an operation on the image $I_C$;
   c. generating an intermediate image $I_F'$ by performing point wise multiplication between corresponding pixels of the image $I_C$ and the low smoothened image $I_L$;
   d. generating a binary image from a residual image $I_R$, said residual image $I_R$ is obtained by subtracting each pixel of high smoothened image $I_H$ from corresponding pixels of the intermediate image $I_F'$;
   e. applying morphological erosion on the binary image for a predetermined number of times;
   f. obtaining rim portion of an image, derived by determining pixel wise difference between the generated binary image and the image obtained after morphological erosion;
   g. obtaining portions of the image $I_C$ to be blurred by placing rim portion of the image as mask over the noise alleviated image; and
   h. performing blurring on the portions of the image $I_C$ obtained in step g by using window of a predetermined size for a predetermined color model and obtaining an corrected image.

2. The method as claimed in claim 1, wherein the noise alleviated image is obtained as $$(I_L - I_H) \cdot I_C \cdot \text{constant},$$

wherein constant is reduction value for different parameters of the predetermined color model, wherein the dot operator (·) denotes point wise multiplication between corresponding pixels of the two images.

3. The method as claimed in claim 2, wherein applying large size median window filter on the image $I_C$ comprises selecting the size of window to be 105×105.

4. The method as claimed in claim 2, wherein applying small size median window filter on the image $I_C$ comprises selecting the size of window to be 7×7.

5. The method as claimed in claim 1, wherein the predetermined color model for the image is selected from at least one or Red Green blue (RGB), Hue Saturation and Intensity (HSI), Hue Saturation and Lightness (HSL), and Hue Saturation and Value (HSV).

6. The method as claimed in claim 3, wherein the constant is 0.7 for red, 0.7 for green and 0.5 for blue when the predetermined color model for the image is RGB.

7. The method as claimed in claim 3, wherein upon performing blurring using RGB model, the window size is 51×51, 51×51, 9×9 for red, green and blue channel respectively.

8. An image processing apparatus for correcting an image, the apparatus comprising:
   an image receiving unit configured to receive the image to be corrected from an image capturing unit;
   a processor coupled to the image receiving unit, said processor is configured to:
      obtain a high smoothened image $I_H$ and a low smoothened image $I_L$ by applying large size and small size median window filter on the image $I_C$;
      obtain a noise alleviated image from $I_H$ and $I_L$, by performing an operation on the image $I_C$;
      generate an intermediate image by performing point wise multiplication between corresponding pixels of the image $I_C$ and the low smoothened image $I_L$;
      generate a binary image from a residual image, said residual image is obtained by subtracting each pixel of highly smoothened image $I_H$ from corresponding pixels of the intermediate image;
      apply morphological erosion on the binary image for a predetermined number of times;
      obtain rim portion of an image, derived by determining pixel wise difference between the generated binary image and the image obtained after morphological erosion;
      obtain portions of the image $I_C$ to be blurred by placing rim portion of the image as mask over the noise alleviated image; and
      perform blurring on the portions of the image $I_C$ obtained in step g by using window of a predetermined size for a predetermined color model and obtaining a corrected image; and
   a memory unit coupled with the processor.

* * * * *

UNITED STATES PATENT AND TRADEMARK OFFICE
CERTIFICATE OF CORRECTION

| | | |
|---|---|---|
| PATENT NO. | : 9,258,460 B2 | Page 1 of 1 |
| APPLICATION NO. | : 14/103957 | |
| DATED | : February 9, 2016 | |
| INVENTOR(S) | : Rao et al. | |

It is certified that error appears in the above-identified patent and that said Letters Patent is hereby corrected as shown below:

Title Page, (72) Inventors:
"Sriram Padmanavhan" should be --Sriram Padmanabhan--

Signed and Sealed this
Twelfth Day of July, 2016

Michelle K. Lee
*Director of the United States Patent and Trademark Office*